(12) United States Patent
Allen et al.

(10) Patent No.: US 11,317,242 B1
(45) Date of Patent: Apr. 26, 2022

(54) SYSTEM AND METHOD FOR DETECTING A DISTANCE THRESHOLD BETWEEN A TARGET DEVICE AND A MOBILE DEVICE HAS BEEN EXCEEDED

(71) Applicant: Bank of America Corporation, Charlotte, NC (US)

(72) Inventors: Morgan S. Allen, Waxhaw, NC (US); Willard H. Waldron, III, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/140,953

(22) Filed: Jan. 4, 2021

(51) Int. Cl.
*H04W 4/02* (2018.01)
*H04W 4/80* (2018.01)

(52) U.S. Cl.
CPC ............. *H04W 4/023* (2013.01); *H04W 4/80* (2018.02)

(58) Field of Classification Search
CPC ................................ H04W 4/023; H04W 4/80
See application file for complete search history.

(56) References Cited

U.S. PATENT DOCUMENTS

| | | |
|---|---|---|
| 9,268,545 B2 | 2/2016 | Lortz et al. |
| 9,892,293 B1 | 2/2018 | Wade et al. |
| 9,929,917 B2 | 3/2018 | Jones-McFadden et al. |
| 9,946,676 B2 | 4/2018 | Wagh et al. |
| 9,989,997 B2 | 6/2018 | Magi |
| 10,049,349 B1 | 8/2018 | Grassadonia et al. |
| 10,142,113 B2 | 11/2018 | Zaidi et al. |
| 10,157,420 B2 | 12/2018 | Narayana et al. |
| 10,158,535 B2 | 12/2018 | Jones-McFadden et al. |
| 10,162,347 B2 | 12/2018 | Shim et al. |
| 10,169,820 B2 | 1/2019 | Narayana et al. |
| 10,325,428 B1 | 6/2019 | Kurian et al. |
| 10,339,278 B2 | 7/2019 | Baldwin et al. |
| 10,360,557 B2 | 7/2019 | Locke et al. |
| 10,402,892 B2 | 9/2019 | Kurian et al. |
| 10,437,984 B2 | 10/2019 | Votaw et al. |
| 10,445,754 B2 | 10/2019 | Snider et al. |
| 10,453,059 B2 | 10/2019 | Lloyd et al. |
| 10,546,302 B2 | 1/2020 | Zovi et al. |
| 10,572,791 B2 | 2/2020 | Wurmfeld et al. |
| 10,606,226 B2 | 3/2020 | Chun et al. |
| 10,620,591 B2 | 4/2020 | Rothkopf et al. |
| 10,672,060 B2 | 6/2020 | Ricci |
| 10,783,423 B2 | 9/2020 | Wurmfeld et al. |
| 10,796,516 B2 | 10/2020 | Meadow |

(Continued)

*Primary Examiner* — Nader Bolourchi

(57) ABSTRACT

A target device is configured to communicatively connect to a common network and a mobile device. The mobile device includes a processor operable to determine that the mobile device is not within a proximity distance threshold to the target device as indicated by a lack of connectivity with the target device through a short-range wireless protocol. The processor is further operable to determine that both the mobile device and the target device are connected to the common network at a first time period, wherein the common network is designated as a safe zone for each of the target device and the mobile device. The processor is then operable to determine that at least one of the mobile device and the target device is not connected to the common network at a second time period after the first time period. An alert is produced via the mobile device as a result.

20 Claims, 5 Drawing Sheets

(56) References Cited

U.S. PATENT DOCUMENTS

| | | |
|---|---|---|
| 11,178,537 B2 * | 11/2021 | Chandra .......... H04W 36/0038 |
| 2016/0253651 A1 | 9/2016 | Park et al. |
| 2017/0061405 A1 | 3/2017 | Bryant |
| 2017/0061424 A1 | 3/2017 | Dent et al. |
| 2017/0091765 A1 | 3/2017 | Lloyd et al. |
| 2018/0103341 A1 * | 4/2018 | Moiyallah, Jr. ..... G06F 3/04842 |
| 2018/0150823 A1 | 5/2018 | Omojola et al. |
| 2018/0240106 A1 | 8/2018 | Garrett et al. |
| 2019/0012672 A1 | 1/2019 | Francesco |
| 2019/0050445 A1 | 2/2019 | Griffith et al. |
| 2019/0220719 A1 | 7/2019 | Locke et al. |
| 2020/0177377 A1 | 6/2020 | Smith et al. |
| 2020/0274861 A1 | 8/2020 | Black et al. |

* cited by examiner

SYSTEM AND METHOD FOR DETECTING A DISTANCE THRESHOLD BETWEEN A TARGET DEVICE AND A MOBILE DEVICE HAS BEEN EXCEEDED

TECHNICAL FIELD

The present disclosure relates generally to layered communications between a target device and a mobile device. More particularly, in certain embodiments, the present disclosure is related to an application for alerting a user that a distance threshold between the target device and the mobile device has been exceeded.

BACKGROUND

Often, a user has both a mobile device and a secondary item, such as a wallet, in one's possession in most situations. It is not uncommon for one to be separated from the other. For example, a user may bring the mobile device from a first location to a second location while leaving the secondary item at the first location.

SUMMARY

A given user may be in possession of a mobile device and a target device, such as a credit card. Often, as the user moves around, there can be separation between the two as the user may inadvertently leave one behind. For example, the user may bring the mobile device from a first location to a second location while leaving the target device at the first location. Depending on the environment that the user is in, the user may have greater concern as to knowing the location of the target device. For example, if the user is at home, the user may not feel the need to know the location of the target device. But, if the user is at some other public location, such as at a restaurant, the target device would be more susceptible to theft and the user would want to maintain possession of that target device. The present disclosure provides for a system of layered communication that produces an alert for the user indicating separation between the mobile device and the target device. Both the mobile device and the target device may be communicatively connected to each other, wherein the connectivity relates to a distance threshold. If the distance between the mobile device and the target device increases to the point of exceeding the distance threshold, the connectivity between them will break or disconnect. The mobile device may recognize that it is no longer connected to the target device, and the mobile device may produce an alert, such as a noise or vibration, that would convey to the user that the user is not in possession of the target device.

In an embodiment, a system includes a target device and a mobile device. The target device includes a processor configured to transmit signals to communicatively connect to a common network through a network interface and transmit signals to communicatively connect to the mobile device through a short-range wireless protocol. The mobile device includes a memory operable to store a proximity distance threshold, a plurality of selectable short-range wireless protocols related to the proximity distance threshold, and a selected threshold distance. The mobile device further includes a processor that is communicatively coupled to the memory. The processor of the mobile device is configured to determine that the mobile device is not within the proximity distance threshold to the target device as indicated by a lack of connectivity with the target device through the short-range wireless protocol. Once determined, the processor of the mobile device transmits to the memory of the mobile device that the mobile device is not within the proximity distance threshold to the target device. In response to determining that the mobile device is not within the proximity distance threshold to the target device, the processor of the mobile device is further configured to determine that both the mobile device and the target device are connected to the common network at a first time period, wherein the common network is designated as a safe zone for each of the target device and the mobile device. At a second time period, the processor of the mobile device is further configured to determine that at least one of the mobile device and the target device is not connected to the common network, wherein the second time period is after the first time period. In response to determining that at least one of the mobile device and the target device is not connected to the common network at the second time period, the processor of the mobile device is further configured to produce an alert via the mobile device.

Previous technology used for communicatively connecting two devices suffers from disadvantages. For example, this disclosure recognizes that short-range wireless protocols may be limited by a certain distance threshold. For example, communication through near-field communications may be broken if one device is more than two feet away from the other. Also, public communications networks may be susceptible to hacking, making a user cautious to connect to that communication network.

Certain embodiments of this disclosure provide unique solutions to the technical problems identified above by providing a new layered communication system. For example, the disclosed system provide several technical advantages, which include: 1) two layers of communication between a mobile device and a target device; 2) user input for selecting a short-range wireless protocol to implement; 3) user input for optionally disabling a second layer of communication based on the environment; and 4) the ability to disable the target device for a period of time. As such, this disclosure may improve the function of computing systems used to produce an alert when a communication link between the mobile device and the target device is broken.

In some embodiments, improvements provided by this disclosure are incorporated into the practical application of a layered communication system. The layered communication system may allow for a user to increase the range of distance allowable between a mobile device and a target device before disconnection between the two and a resulting alert is produced. In a first environment, the user may not want to receive an alert when a first layer of communication breaks. The allowable distance between the mobile device and the target device based on the first layer may be small, which is not practical in the first location. The layer communication system may have the devices connect indirectly over a communication network, which may increase the allowable distance between the two. Once that distance is exceeded, the system alerts the user. In a second location, the user may want to limit the allowable distance between the devices to a smaller range, such as that used with the first layer of communication. The system may be configured to allow the user to indicate that the mobile device should produce an alert after the allowable distance based on the first layer is exceeded. The layer communication system provides for customization regarding when to produce an alert based on the environment surrounding the user.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
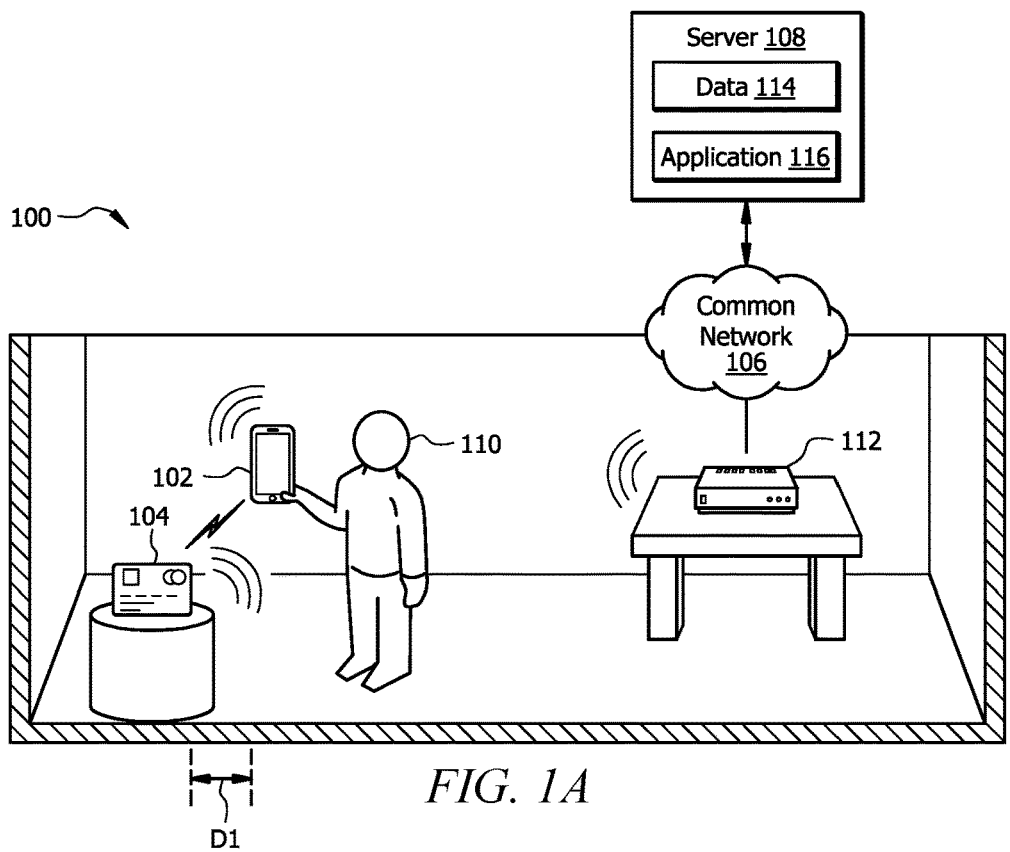
FIG. 1A is a schematic diagram of an example system for layered communications between a target device and a mobile device.
Figure 1B:
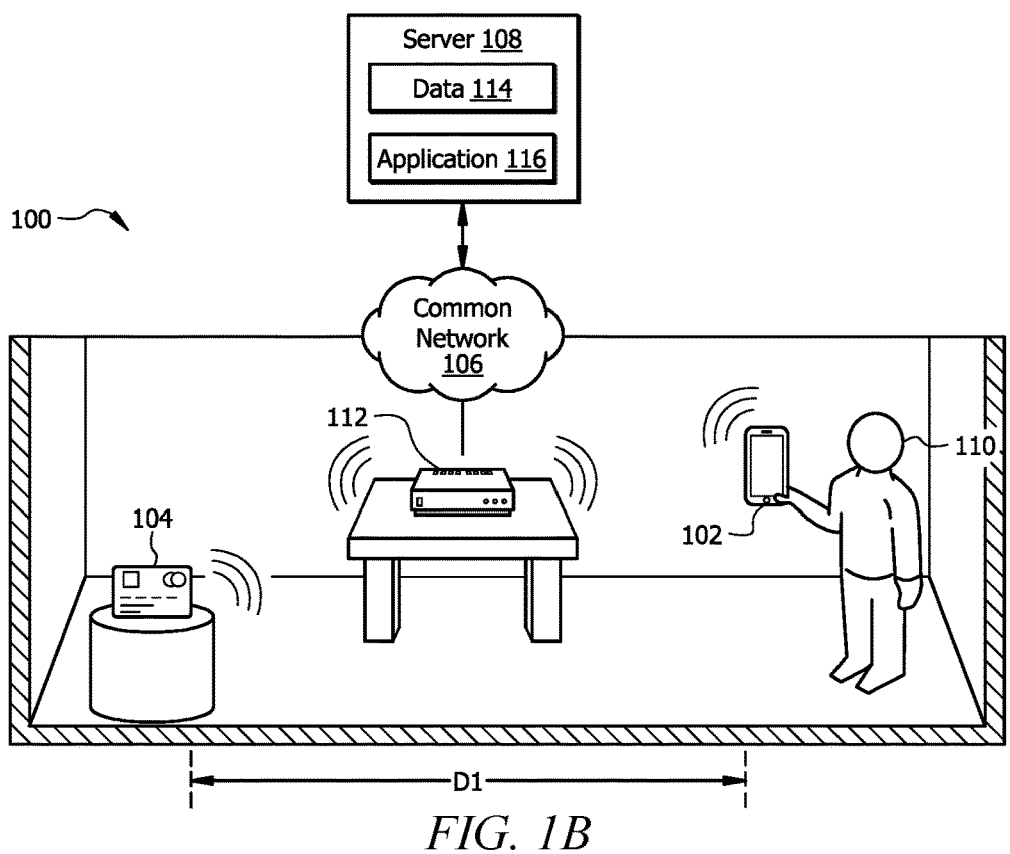
FIG. 1B is a schematic diagram of the example system of FIG. 1A where a first layer of communication is broken.
Figure 1C:
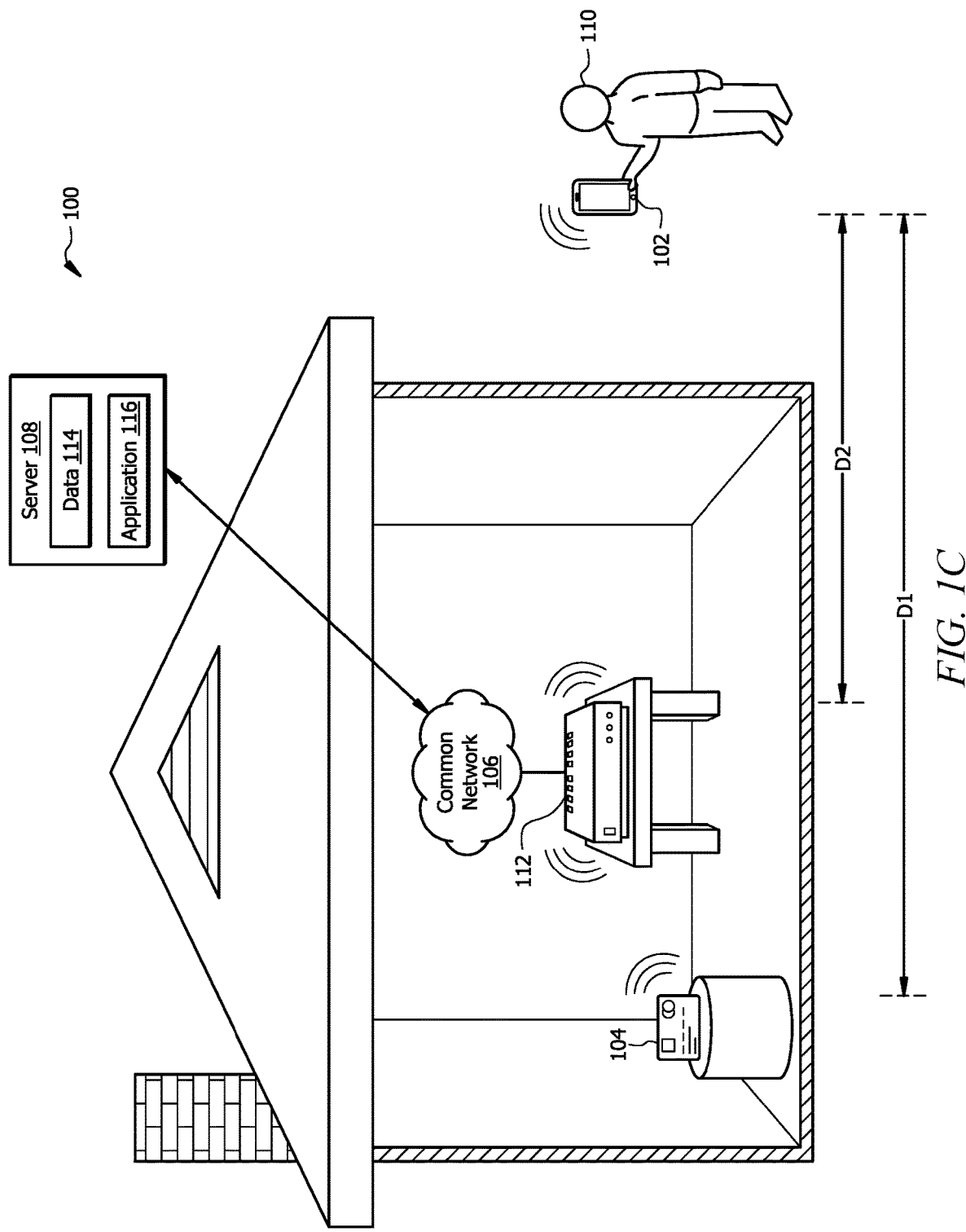
FIG. 1C is a schematic diagram of the example system of FIG. 1A where a second layer of communication is broken.
Figure 2:
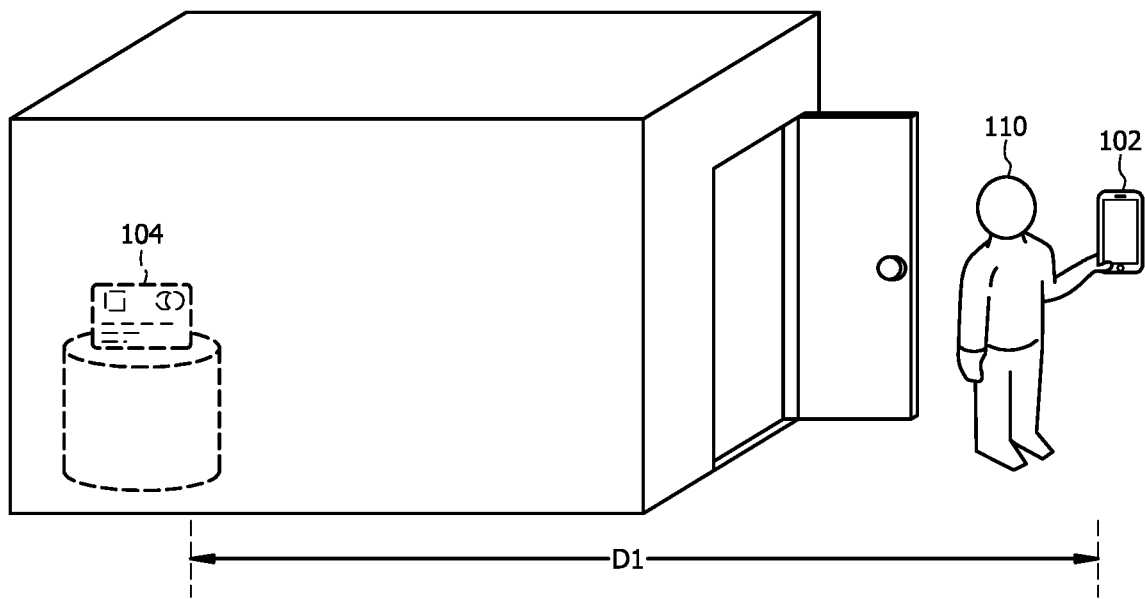
FIG. 2 is a schematic diagram of the example system of FIG. 1A where there is a singular layer of communication.
Figure 3:
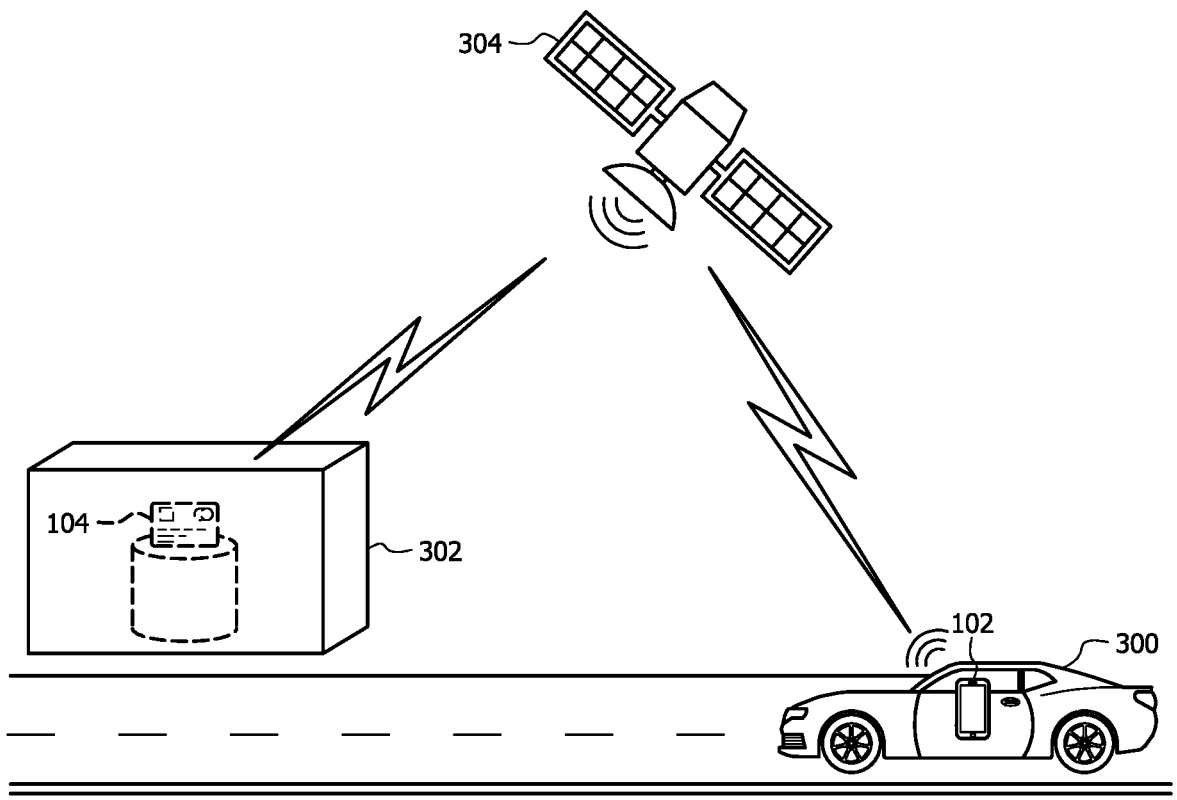
FIG. 3 is a schematic diagram of the example system of FIG. 1A using global positioning system data.
Figure 4:
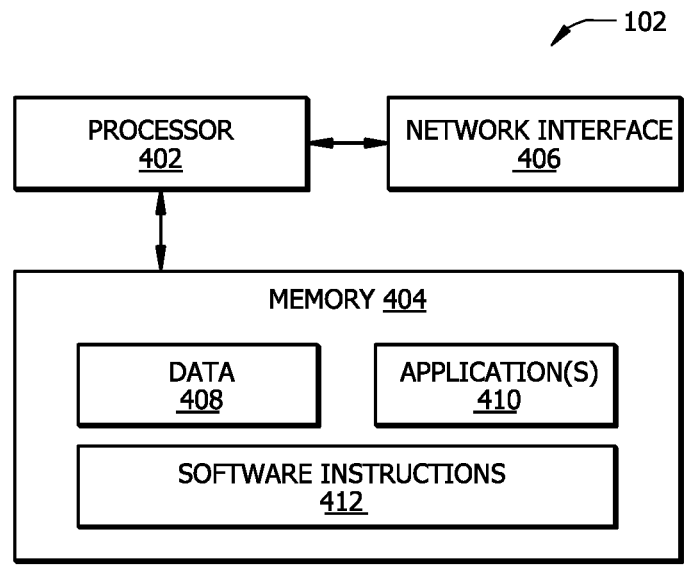
FIG. 4 is a block diagram of an example mobile device of the system of FIG. 1A.
Figure 5:
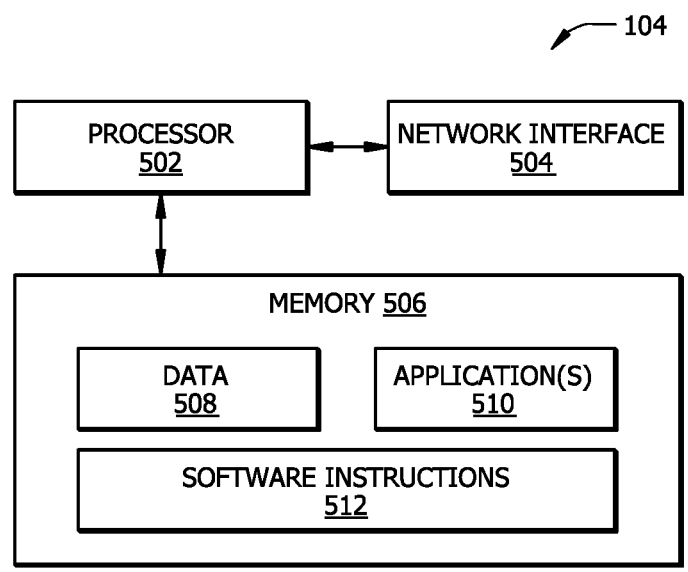
FIG. 5 is a block diagram of an example target device of the system of FIG. 1A.
Figure 6:
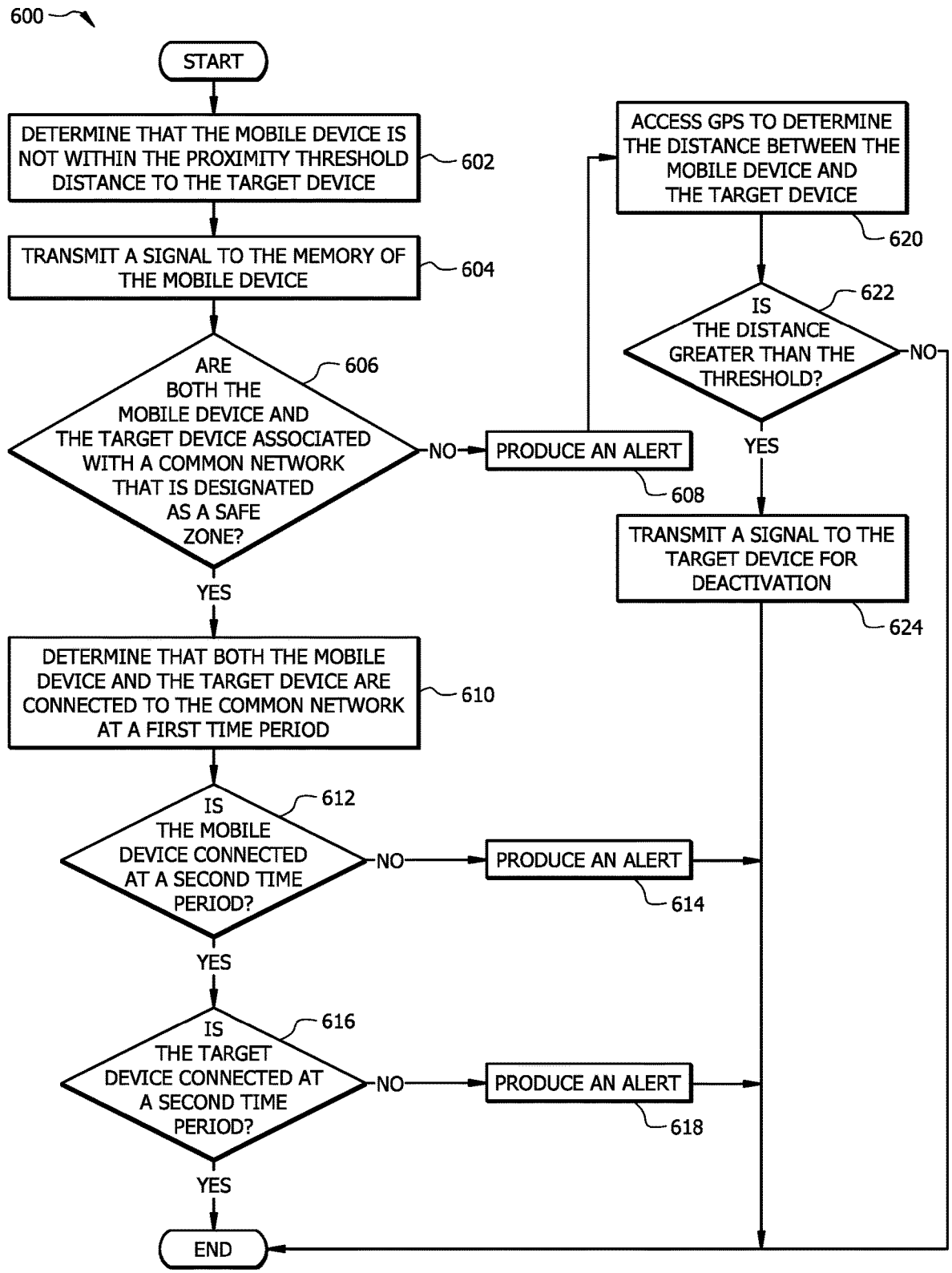
FIG. 6 is a flow diagram illustrating an example operation of the system of FIGS. 1A-1C.

This disclosure provides solutions to the aforementioned and other problems of previous technology by producing an alert for a user indicating separation between a mobile device and a target device. FIG. 1A illustrates an example system for layered communications between a target device and a mobile device. FIG. 1B illustrates the example system of FIG. 1A wherein a first layer of communication is broken. FIG. 1C illustrates the example system of FIG. 1A wherein a second layer of communication is broken. FIG. 2 illustrates the example system of FIG. 1A wherein there is a singular layer of communication. FIG. 3 illustrates the example system of FIG. 1A using global positioning system data. FIG. 4 illustrates an example mobile device of the system of FIG. 1A. FIG. 5 illustrates an example target device of the system of FIG. 1A. FIG. 6 illustrates an example method operation of the system of FIG. 1A.

Layered Communication System

FIGS. 1A-1C illustrate a schematic diagram of an example system 100 for the verification that a mobile device 102 is within a proximity distance threshold of a target device 104. The system 100 may include the mobile device 102, the target device 104, a common network 106, and an external server 108. The system 100 may provide for layered communications between the mobile device 102 and the target device 104, wherein a first layer of communication may be a direct communication link from the mobile device 102 to the target device 104, and wherein a second layer of communication may be an indirect communication link from the mobile device 102 to the target device 104 through the common network 106. In certain embodiments where the first layer of communication and/or the second layer of communication between the mobile device 102 and the target device 104 is broken, an alert may be produced to inform a user 110 that the distance between the mobile device 102 and the target device 104 has exceeded the proximity distance threshold stored in the mobile device 102 and/or in the external server 108.

The mobile device 102 may generally be any suitable computing device transportable by the user 110. For example, the mobile device 102 may be a smartphone that includes a user interface (e.g., a touchscreen, a display and keypad, and/or the like) operable to provide user input and display data. The mobile device 102 may be configured to transmit signals to communicatively connect to the target device 104 and/or to the common network 106, to receive, process, and store data, to transmit instructions to the target device 104 and/or to the external server 108, and any combinations thereof. In some embodiments, the user 110 may provide user input into the mobile device 102 that affects how the mobile device 102 operates in relation to the target device 104. For example, the user 110 may designate a value for the proximity distance threshold, wherein the proximity distance threshold is related to a spatial range of connectivity through a given short-range wireless protocol. Depending on the value designated as the proximity distance threshold, the mobile device 102 may determine and operate under one of a plurality of potential short-range wireless protocols available to the mobile device 102. An example mobile device 102 and its operations using a respective processor, memory, and interface is described below with respect to FIGS. 4 and 6.

The target device 104 may generally be any suitable hand-held structure transportable by the user 110 and comprising an attachable computing device (for example, a radio frequency identification (RFID) tag). For example, the target device 104 may be a credit card, a wallet, one or more keys, a purse or handbag, and any combinations thereof. In these embodiments, the attachable computing device may be coupled to the target device 104 during the manufacturing process or post-manufacturing. The target device 104 may be configured to transmit signals to communicatively connect to the mobile device 102 and/or to the common network 106, to receive signals, and any combinations thereof. In embodiments, the target device 104 may passively or actively transmit signals to the mobile device 102 and/or to the common network 106. An example target device 104 and its operations using an attachable computing device is described below with respect to FIGS. 5-6.

The common network 106 may facilitate communication between and amongst the various components of the system 100. This disclosure contemplates the common network 106 being any suitable network operable to facilitate communication between the components of the system 100. Common network 106 may include any interconnecting system capable of transmitting audio, video, signals, data, messages, or any combination of the preceding. Common network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. In embodiments, the common network 106 may be accessed using a router 112. The router 112 may be a networking device that is configured to enable wired and/or wireless communications between the common network 106 and other network devices, systems, or domain(s). For example, the router 112 may configured to send and receive data to the common network 106, the mobile device 102, the target device 104, and any combinations thereof. The router 112 may be configured to use any suitable type of communication protocol as would be appreciated by one of ordinary skill in the art.

The external server 108 is generally a suitable server (e.g., including a physical server and/or virtual server) operable to store data 114 and/or provide access to application(s) 116 or other services with restricted access. The data 114 may be data to be viewed or accessed by the user 110 who has been preapproved to have access to this data 114. For example, the data 114 may include personal information, private information, and/or the like. The application 116 may be any suitable application which may be employed to review and/or access the data 114. The external server 108 may be accessed using the example mobile device 102 and its operations using a respective processor, memory, and interface is described below with respect to FIGS. 4 and 6.

Example Operation of the Layered Communication System where Both the First Layer and the Second Layer of Communication are Established In an example operation of the system 100, as illustrated in FIG. 1A, the user 110 may be operating the mobile device 102 within a predetermined proximity distance threshold. In one or more embodiments, the user 110 may input a value for the proximity distance threshold into the mobile device 102 in order to implement a corresponding short-range wireless protocol for direct communication between the mobile device 102 and the target device 104. In response to inputting a value for the proximity distance threshold, the mobile device 102 may determine the corresponding short-range wireless protocol based, at least in part, on a range of values stored in the mobile device 102 and/or in the external server 108. For example, the system 100 may employ near-field communications as the short-range wireless protocol if the value inputted for the proximity distance threshold is between about one inch and about two feet. In another example, the system 100 may employ Bluetooth as the short-range wireless protocol if the value inputted for the proximity distance threshold is between about two feet and about one hundred feet. As shown in FIG. 1A, a distance d1 between the mobile device 102 and the target device 104 may be less than the proximity distance threshold.

While the mobile device 102 and the target device 104 are operating within the proximity distance threshold, the target device 104 may be transmitting signals to the mobile device 102 in order to communicatively connect to the mobile device 102. Further, the mobile device 102 may be configured to receive the signals transmitted by the target device 104 to establish a direct communication link between the two. In alternate embodiments, the mobile device 102 may be further configured to transmit signals to the target device 104 to communicatively connect to the target device 104, to energize the target device 104 to operate, and any combinations thereof. The established direct communication link may be designated as a first layer of communication within the system 100.

Concurrently, both the mobile device 102 and the target device 104 may be transmitting signals to communicatively connect to the common network 106 through the router 112. In embodiments, the router 112 may be configured to receive the transmitted signals from both the mobile device 102 and the target device 104, wherein receiving the transmitted signals from either the mobile device 102 or the target device 104 establishes a connection between the router 112 and that device. Once the mobile device 102 has established a connection with the router 112, the mobile device 102 may be configured to access the common network 106 to determine if the target device 104 has also established a connection with the router 112. If the target device 104 has established a connection with the router 112, there may be a second layer of communication established as this indirect communication link between mobile device 102 and the target device 104 through the common network 106.

In one or more embodiments, the user 110 may input a designation into the mobile device 102 to determine that the common network 106 is a safe zone for operation with the system 100. With regards to the present disclosure, a safe zone may be contemplated herein as a suitable network operable to facilitate communication between the components of the system 100 that operates under restrictions prior to accessing the network. For example, a private Wi-Fi network requiring log-in credentials (such as the network name and a password) prior to connectivity may be a safe zone for the user 110. In the illustrated example, the common network 106 may be designated by the user 110 as a safe zone for operations. In one or more embodiments, if the common network 106 is not a safe zone, the second layer of communication may not be established as the mobile device 102 and/or the target device 104 may not connect to the common network 106.

Example Operation of the Layered Communication System where the First Layer Communication is Broken With reference now to FIG. 1B, as the user 110 moves further away in relation to the target device 104 while in possession of the mobile device 102, the distance d1 between the mobile device 102 and the target device 104 may exceed the proximity distance threshold. If the distance d1 is greater than the proximity distance threshold, there may be a lack of connectivity between the mobile device 102 and the target device 104 through the implemented short-term range wireless protocol. The mobile device 102 may be configured to determine that the mobile device 102 is not within the proximity threshold distance based, at least in part, on the lack of connectivity through the implemented short-term range wireless protocol. In embodiments, the mobile device 102 and the target device 104 may be able to establish the indirect communication link between mobile device 102 and the target device 104 through the common network 106, as described above with respect to FIG. 1A.

Example Operation of the Layered Communication System where the Second Layer Communication is Broken With reference now to FIG. 1C, the indirect communication link between the mobile device 102 and the target device 104 through the common network 106 may not be able to be established. As illustrated, the user 110 may move further away in relation to the target device 104 while in possession of the mobile device 102. The mobile device 102 may have additionally moved further away from a network interface for the common network 106, such as the router 112, wherein a distance d2 defined as the distance between the mobile device 102 and the router 112 may increase. As the distance d2 increases, the distance d2 may exceed a threshold distance that defines the range of connectivity of the router 112. In embodiments, the threshold distance may be stored in the mobile device 102 and/or in the external server 108. For example, the threshold distance may be stored as a value between about one hundred feet and about three hundred feet. If signals are being transmitted to the router 112 from a distance greater than the threshold distance, the router 112 may not be able to receive those transmitted signals and thereby may not establish a connection with that transmitting device.

At a first time period, the mobile device 102 may transmit signals to the router 112 to establish a connection in order to access the common network 106. If the router 112 receives the transmitted signals, a connection between the mobile device 102 and the router 112 may be established, and the mobile device 102 may be able to further determine if the target device 104 is also connected to the router 112. At a second time period, the mobile device 102 may continue to transmit signals to the router 112 to establish and/or maintain a connection in order to access the common network 106. If the router 112 does not receive the transmitted signals, the mobile device 102 may determine that the distance d2 between the mobile device 102 and the router 112 is greater than the threshold distance and that the mobile device 102 is not communicatively connected to the router 112 and subsequently the common network 106. In other embodiments, the mobile device 102 may maintain a connection with the router 112, but the target device 104 may be displaced by a distance that is greater than the threshold distance of the router 112. In those embodiments, the target device 104 may lose connectivity with the router 112 and subsequently with the common network 106.

In a case where the mobile device 102 has determined that at least one of the mobile device 102 and the target device 104 is not connected to the common network 106, the mobile device 102 may be configured to produce an alert. The alert may indicate to the user 110 that the mobile device 102 is not within the same general area as the target device 104. In these embodiments, the alert may be produced after a determination that the mobile device 102 has exceeded the proximity distance threshold to the target device 104 and that at least one of the mobile device 102 and the target device 104 is not connected to the common network 106. Without limitations, the alert may comprise at least one of a visual display, an audible noise, one or more vibrations, and any combinations thereof.

Example Operation of the Layered Communication System Utilizing a Singular Layer of Communication FIG. 2 illustrates a schematic diagram of the example system 100 (referring to FIGS. 1A-1C) utilizing a singular layer of communication between the mobile device 102 and the target device 104. In this case, the user 110 may be in an environment wherein there is not a common network 106 (referring to FIGS. 1A-1C) designated as a safe zone, as previously described above with respect to FIG. 1A. For example, the user 110 may be at a restaurant, a store, and the like, wherein there may be public Wi-Fi networks available for access, but these public Wi-Fi networks may not be secure. As the public Wi-Fi networks may not be secure, the user 110 may elect to employ solely a singular layer of communication between the mobile device 102 and the target device 104, wherein the singular layer of communication is the first layer of communication established through the designated short-range wireless protocol as described above with respect to FIGS. 1A-1C.

At a first time period, the mobile device 102 and the target device 104 may be operating within the proximity distance threshold, wherein the target device 104 may be transmitting signals to the mobile device 102 in order to communicatively connect to the mobile device 102. The mobile device 102 may be configured to receive the signals transmitted by the target device 104 to establish a direct communication link between the two. As previously described above with respect to FIG. 1A, the mobile device 102 may be further configured to transmit signals to the target device 104 to communicatively connect to the target device 104, to energize the target device 104 to operate, and any combinations thereof. In this embodiment, the established direct communication link may be the first, singular layer of communication within the system 100.

At a second time period, the user 110, while in possession of the mobile device 102, may move away from the target device 104, thereby increasing the distance d1. If the distance d1 is greater than the proximity distance threshold, there may be a lack of connectivity between the mobile device 102 and the target device 104 through the implemented short-term range wireless protocol. The mobile device 102 may be configured to determine that the mobile device 102 is not within the proximity threshold distance based, at least in part, on the lack of connectivity through the implemented short-term range wireless protocol.

In the present case where the mobile device 102 has determined that the mobile device 102 is not within the proximity threshold distance in relation to the target device 104, the mobile device 102 may be configured to produce an alert. The alert may indicate to the user 110 that the mobile device 102 is not within the same general area as the target device 104. In these embodiments, the alert may be produced after a determination that the mobile device 102 has exceeded the proximity distance threshold to the target device 104.

Example Operation of the Layered Communication System Disabling the Target Device FIG. 3 illustrates a schematic diagram of the example system 100 (referring to FIGS. 1A-1C) utilizing global positioning system (GPS) data. As in FIG. 2, the user 110 (referring to FIGS. 1A-1C) may be in an environment wherein there is not a common network 106 (referring to FIGS. 1A-1C) designated as a safe zone. In the illustrated embodiment, the user 110 may have or continue to be moving further away from the target device 104. For example, the user 110 may be in a vehicle 300 driving away from a first location 5122 while in possession of the mobile device 102, wherein the target device 104 is located at the first location 5122. As the mobile device 102 determines that the mobile device 102 has exceeded the proximity distance threshold to the target device 104, the mobile device 102 may produce an alert. The alert may indicate to the user 110 that the mobile device 102 is not within the same general area as the target device 104.

In response to producing the alert, the mobile device 102 may be further configured to access GPS data from a satellite 304 to determine a distance between the mobile device 102 and the target device 104. The mobile device 102 may be further configured to determine the distance between the mobile device 102 and the target device 104 based, at least in part, on the GPS data and to compare that distance to a third threshold distance, wherein the third threshold distance may be the distance between the mobile device 102 and the target device 104 required before a signal is to be sent to disable the target device 104. In embodiments, the third threshold distance may be stored in the mobile device 102 and/or in the external server 108 (referring to FIGS. 1A-1C). For example, the third threshold distance may be stored as a value between about five hundred feet and about one mile. If the distance between the mobile device 102 and the target device 104 is greater than the third threshold distance, the mobile device 102 may transmit a signal to instruct the target device 104 to disable for a period of time. Without limitations, the period of time may be from about one hour to about twenty-four hours. The transmitted signal may indirectly be sent to the target device 104 from the satellite 304, from the common network 106, from any other suitable communication network, and any combinations thereof.

Example Mobile Device

FIG. 4 is an example of a mobile device 102 of FIG. 1A—3. The mobile device 102 may include a processor 402, a memory 404, and a network interface 406. The mobile device 102 may be configured as shown or in any other suitable configuration.

The processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404 and the network interface 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1A-3 and 6. In some embodiments, the function described herein is implemented using logic units, FPGAs, ASICs, DSPs, or any other suitable hardware or electronic circuitry.

The memory 404 is operable to store any of the information described with respect to FIGS. 1A-3 and 6 along with any other data, instructions, logic, rules, or code operable to implement the function(s) described herein of the external server 108 (referring to FIG. 1) and/or when executed by processor 402. For example, the memory 404 may store data 408, code for application(s) 410, and/or software instructions 412, which are described below with respect to FIG. 6. The memory 404 comprises one or more disks, tape drives, or solid-state drives, and may be used as an over-flow data storage device, to store programs when such programs are selected for execution, and to store instructions and data that are read during program execution. The memory 404 may be volatile or non-volatile and may comprise read-only memory (ROM), random-access memory (RAM), ternary content-addressable memory (TCAM), dynamic random-access memory (DRAM), and static random-access memory (SRAM).

The network interface 406 is configured to enable wired and/or wireless communications. The network interface 406 is configured to communicate data between the mobile device 102 and other network devices, systems, or domain(s). For example, the network interface 406 may comprise a WIFI interface, a local area network (LAN) interface, a wide area network (WAN) interface, a modem, a switch, or a router. The processor 402 is configured to send and receive data using the network interface 406. The network interface 406 may be configured to use any suitable type of communication protocol as would be appreciated by one of ordinary skill in the art.

Example Target Device

FIG. 5 is an example of a target device 104 of FIG. 1A—3. The target device 104 may include a processor 502, a network interface 504, and optionally, a memory 506. The target device 104 may be configured as shown or in any other configuration.

The processor 502 comprises one or more processors operably coupled to the memory 506. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 506 and the network interface 504. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1A-3 and 6. In some embodiments, the function described herein is implemented using logic units, FPGAs, ASICs, DSPs, or any other suitable hardware or electronic circuitry.

The network interface 504 is configured to enable wired and/or wireless communications. The network interface 504 is configured to communicate data between the target device 104 and other network devices, systems, or domain(s). For example, the network interface 504 may comprise a WIFI interface, a local area network (LAN) interface, a wide area network (WAN) interface, a modem, a switch, or a router. The processor 502 is configured to send and receive data using the network interface 504. The network interface 504 may be configured to use any suitable type of communication protocol as would be appreciated by one of ordinary skill in the art.

In embodiments, the memory 506 may or may not be utilized in the target device 104. The memory 506 is operable to store any of the information described with respect to FIGS. 1A-3 and 6 along with any other data, instructions, logic, rules, or code operable to implement the function(s) described herein of the external server 108 (referring to FIG. 1) and/or when executed by processor 502. For example, the memory 506 may store data 508, code for application(s) 510, and/or software instructions 512, which are described below with respect to FIG. 6. The memory 506 comprises one or more disks, tape drives, or solid-state drives, and may be used as an over-flow data storage device, to store programs when such programs are selected for execution, and to store instructions and data that are read during program execution. The memory 506 may be volatile or non-volatile and may comprise read-only memory (ROM), random-access memory (RAM), ternary content-addressable memory (TCAM), dynamic random-access memory (DRAM), and static random-access memory (SRAM).

Example Operation of the Mobile Device and Target Device

FIG. 6 is a flow diagram illustrating an example method 600 of the system 100 of FIGS. 1A-1C. The method 600 may be implemented using the mobile device 102 of FIG. 4 and the target device 104 of FIG. 5. The method 600 may begin at step 602 where the mobile device 102 may determine that the mobile device 102 is not within the proximity distance threshold to the target device 104 as indicated by a lack of connectivity with the target device 104 through the short-range wireless protocol. The processor 402 of the mobile device 102 may be configured to instruct the transmission of signals from the mobile device 102 to the target device 104 and to receive transmitted signals from the target device 104. In response to not receiving a transmitted signal from the target device 104 through the short-range wireless protocol, the processor 402 may determine that the distance d1 between the mobile device 102 and the target device 104 is greater than the proximity distance threshold and that there is a lack of connectivity between the mobile device 102 and the target device 104.

At step 604, the processor 402 may transmit to the memory 404 of the mobile device 102 that the distance d1 between the mobile device 102 and the target device 104 is greater than the proximity distance threshold. In further embodiments, the processor 402 may additionally transmit to the external server 108 of FIGS. 1A-1C that the distance d1 between the mobile device 102 and the target device 104 is greater than the proximity distance threshold.

At step 606, the processor 402 may be configured to determine whether the common network 106 of FIGS. 1A-1C is designated as a safe zone, as previously described in FIG. 1A. Prior to operation of the method 600, the user 110 of FIGS. 1A-1C may input a designation into the mobile device 102 to determine that the common network 106 is a safe zone for operation with the system 100. The processor 402 may be configured to transmit to the memory 404 and/or the external server 108 for storing the designation that the common network 106 is a safe zone for operation. If the common network 106 is not designated as a safe zone, the method 600 proceeds to step 608. Otherwise, if the common network 106 is designated as a safe zone, the method 600 proceeds to step 610.

At step 610, the processor 402 may be configured to determine that both the mobile device 102 and the target device 104 are communicatively connected to the common network 106 at a first time period. Both the processor 402 of the mobile device 102 and the processor 502 of the target device 104 may transmit signals to a network interface, such as the router 112 of FIGS. 1A-1C, of the common network 106. A connection may be established between the network interface and the mobile device 102 and between the network interface and the target device 104 if the network interface receives both of the respective transmitted signals. Once the mobile device 102 is connected to the network interface, the processor 402 may be configured to access the common network 106 to determine that the target device 104 is also communicatively connected to the network interface and subsequently the common network 106.

At step 612, the processor 402 may determine whether the mobile device 102 is communicatively connected to the common network 106 at a second time period. The processor 402 may be configured to transmit signals to the network interface to maintain the connection in order to access the common network 106. During operation, the user 110 may displace the mobile device 102 at a distance further away from the network interface of the common network 106. If the network interface does not receive the transmitted signals, the processor 402 may determine that the distance d2 between the mobile device 102 and the network interface is greater than the threshold distance, wherein the threshold distance may be stored in the memory 404 and/or in the external server 108. As such, the processor 402 may determine that the mobile device 102 is not communicatively connected to the common network 106, and the method 600 proceeds to step 614. The processor 402 may further transmit to the memory 404 and/or the external server 108 for storing that the mobile device 102 is not communicatively connected to the common network 106 at a second time. Otherwise, if the mobile device 102 is connected to the common network 106 at a second time period, the method 600 proceeds to step 616. The processor 402 may further transmit to the memory 404 and/or the external server 108 for storing that the mobile device 102 is communicatively connected to the common network 106 at a second time.

At step 616, the processor 402 may determine whether the target device 104 is communicatively connected to the common network 106 at a second time period. While the processor 402 is maintaining a connection to the common network 106, the target device 104 may be displaced at a distance further away from the network interface of the common network 106. If the network interface does not receive the transmitted signals from the target device 104, the processor 402 may determine that the distance between the target device 104 and the network interface is greater than the threshold distance. As such, the processor 402 may determine that the target device 104 is not communicatively connected to the common network 106, and the method 600 proceeds to step 618. The processor 402 may further transmit to the memory 404 and/or the external server 108 for storing that the target device 104 is not communicatively connected to the common network 106 at a second time. Otherwise, if the processor 402 determines that the target device 104 is connected to the common network 106 at a second time period, the method 600 proceeds to step 620. The processor 402 may further transmit to the memory 404 and/or the external server 108 for storing that the target device 104 is communicatively connected to the common network 106 at a second time.

At each of step 608, step 614, and step 618, the processor 402 of the mobile device 102 may produce an alert. The alert may comprise at least one of a visual display, an audible noise, one or more vibrations, and any combinations thereof. The produced alert may provide a general indication to the user 110 that the mobile device 102 is not spatially near the target device 104. After step 614 and step 618, the method may proceed to end. However, after step 608, the method 600 may proceed to step 620.

At step 620, the processor 402 may establish communication with a satellite 304 in order to access GPS data. The processor 402 may further determine the distance between the mobile device 102 and the target device 104 based, at least in part, on the GPS data and may compare that distance to the third threshold distance, wherein the third threshold distance may be stored in the memory 404 and/or in the external server 108.

At step 622, the processor 402 may determine whether the distance between the mobile device 102 and the target device 104 is greater than the third threshold distance. If the distance between the mobile device 102 and the target device 104 is greater than the third threshold distance, the processor 402 may transmit to the memory 404 and/or the external server 108 for storing that the distance is greater than the third threshold distance, and the method 600 proceeds to step 624. Otherwise, if the distance is not greater than the third threshold distance, the method 600 proceeds to end.

At step 624, the processor 402 may transmit a signal to instruct the target device 104 to disable for a period of time. Without limitations, the period of time may be from about one hour to about twenty-four hours. The transmitted signal may indirectly be sent to the target device 104 from the satellite 304, from the common network 106, from any other suitable communication network, and any combinations thereof. Once the processor 402 indirectly transmits the signal to the target device 104, the method proceeds to end.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
   a target device comprising a processor configured to:
      transmit signals to communicatively connect to a common network through a network interface; and
      transmit signals to communicatively connect to a mobile device through a short-range wireless protocol; and
   the mobile device comprising:
      a memory operable to store a proximity distance threshold, a plurality of selectable short-range wireless protocols related to the proximity distance threshold, and a threshold distance; and
      a processor communicatively coupled to the memory and configured to:
         determine that the mobile device is not within the proximity distance threshold to the target device as indicated by a lack of connectivity with the target device through the short-range wireless protocol;
         transmit to the memory of the mobile device that the mobile device is not within the proximity distance threshold to the target device;
         in response to determining that the mobile device is not within the proximity distance threshold to the target device, determine that both the mobile device and the target device are connected to the common network at a first time period, wherein the common network is designated as a safe zone for each of the target device and the mobile device;
         determine that at least one of the mobile device and the target device is not connected to the common network at a second time period after the first time period; and
         in response to determining that at least one of the mobile device and the target device is not connected to the common network at the second time period, produce an alert via the mobile device.

2. The system of claim 1, wherein the processor of the mobile device is further configured to:
   determine that the proximity threshold distance is three feet;
   transmit to the memory of one or both of the mobile device and an external server that the proximity threshold distance is three feet; and
   in response to determining that the proximity threshold distance is three feet, designate the short-range wireless protocol as near-field communications.

3. The system of claim 1, wherein the processor of the mobile device is further configured to:
   determine that the proximity threshold distance is ten feet;
   transmit to the memory of one or both of the mobile device and an external server that the proximity threshold distance is ten feet; and
   in response to determining that the proximity threshold distance is ten feet, designate the short-range wireless protocol as Bluetooth.

4. The system of claim 1, wherein the processor of the mobile device is further configured to:
   designate the common network as the safe zone, and
   transmit that the common network is the safe zone to the memory of one or both of the mobile device and an external server.

5. The system of claim 1, wherein the processor of the mobile device is further configured to produce the alert to a user of the mobile device via the mobile device when the mobile device is not within the proximity distance threshold to the target device, wherein the alert comprises at least one of a visual display, an audible noise, and one or more vibrations.

6. The system of claim 1, wherein the processor of the mobile device is further configured to:
   in response to producing the alert, access global positioning system (GPS) data to determine a distance between the mobile device and the target device;
   determine that the distance between the mobile device and the target device is greater than the threshold distance stored in the memory of the mobile device; and
   transmit a signal from the mobile device to the target device to disable the target device for a period of time.

7. The system of claim 1, wherein the target device is incorporated into a hand-held structure, wherein the hand-held structure is as a wallet, a purse, a credit card, one or more keys, or combinations thereof.

8. A method of verifying communication between a mobile device and a target device, comprising:
   determining that the mobile device is not within a proximity distance threshold to the target device as indicated by a lack of connectivity with the target device through a short-range wireless protocol;

transmitting to a memory of the mobile device that the mobile device is not within the proximity distance threshold to the target device;
in response to determining that the mobile device is not within the proximity distance threshold to the target device, determining that both the mobile device and the target device are connected to a common network at a first time period, wherein the common network is designated as a safe zone for each of the target device and the mobile device;
determining that at least one of the mobile device and the target device is not connected to the common network at a second time period after the first time period; and
in response to determining that at least one of the mobile device and the target device is not connected to the common network at the second time period, producing an alert via the mobile device.

9. The method of claim 8, wherein the proximity distance threshold is set by a user through the processor of the mobile device and the method further comprising:
determining that the proximity threshold distance is three feet;
transmitting to the memory of one or both of the mobile device and an external server that the proximity threshold distance is three feet; and
in response to determining that the proximity threshold distance is three feet, designating the short-range wireless protocol as near-field communications.

10. The method of claim 8, wherein the proximity distance threshold is set by a user through the processor of the mobile device and the method further comprising:
determining that the proximity threshold distance is ten feet;
transmitting to the memory of one or both of the mobile device and an external server that the proximity threshold distance is ten feet; and
in response to determining that the proximity threshold distance is ten feet, designating the short-range wireless protocol as Bluetooth.

11. The method of claim 8, wherein the processor of the mobile device is configured to designate the common network as the safe zone, and the method further comprising storing the common network as the safe zone in the memory of one or both of the mobile device and an external server.

12. The method of claim 8, further comprising producing the alert to a user of the mobile device via the mobile device when the mobile device is not within the proximity distance threshold to the target device, wherein the alert comprises at least one of a visual display, an audible noise, and one or more vibrations.

13. The method of claim 8, further comprising:
in response to producing the alert, accessing global positioning system (GPS) data to determine a distance between the mobile device and the target device;
determining that the distance between the mobile device and the target device is greater than a threshold distance; and
transmitting a signal from the mobile device to the target device to disable the target device for a period of time.

14. The method of claim 8, wherein the target device is incorporated into a hand-held structure, wherein the hand-held structure is as a wallet, a purse, a credit card, one or more keys, or combinations thereof.

15. A non-transitory computer-readable medium comprising instructions that are configured, when executed by a processor, to:
determine that a mobile device is not within a proximity distance threshold to a target device as indicated by a lack of connectivity with the target device through a short-range wireless protocol;
transmit to a memory of the mobile device that the mobile device is not within the proximity distance threshold to the target device;
in response to determining that the mobile device is not within the proximity distance threshold to the target device, determine that both the mobile device and the target device are connected to a common network at a first time period, wherein the common network is designated as a safe zone for each of the target device and the mobile device;
determine that at least one of the mobile device and the target device is not connected to the common network at a second time period after the first time period; and
in response to determining that at least one of the mobile device and the target device is not connected to the common network at the second time period, produce an alert via the mobile device.

16. The non-transitory computer-readable medium of claim 15, wherein the instructions are further configured, when executed by the processor, to:
determine that the proximity threshold distance is three feet;
transmit to the memory of one or both of the mobile device and an external server that the proximity threshold distance is three feet; and
in response to determining that the proximity threshold distance is three feet, designate the short-range wireless protocol as near-field communications.

17. The non-transitory computer-readable medium of claim 15, wherein the instructions are further configured, when executed by the processor, to:
determine that the proximity threshold distance is ten feet;
transmit to the memory of one or both of the mobile device and an external server that the proximity threshold distance is ten feet; and
in response to determining that the proximity threshold distance is ten feet, designate the short-range wireless protocol as Bluetooth.

18. The non-transitory computer-readable medium of claim 15, wherein the instructions are further configured, when executed by the processor, to:
designate the common network as the safe zone, and
transmit that the common network is the safe zone to the memory of one or both of the mobile device and an external server.

19. The non-transitory computer-readable medium of claim 15, wherein the instructions are further configured, when executed by the processor, to:
produce the alert to a user of the mobile device via the mobile device when the mobile device is not within the proximity distance threshold to the target device, wherein the alert comprises at least one of a visual display, an audible noise, and one or more vibrations.

20. The non-transitory computer-readable medium of claim 15, wherein the instructions are further configured, when executed by the processor, to:
in response to producing the alert, access global positioning system (GPS) data to determine a distance between the mobile device and the target device;
determine that the distance between the mobile device and the target device is greater than a threshold distance stored in a memory of the mobile device; and transmit a signal from the mobile device to the target device to disable the target device for a period of time.

\* \* \* \* \*